(12) United States Patent
Sheu et al.

(10) Patent No.: US 12,545,758 B2
(45) Date of Patent: Feb. 10, 2026

(54) POLYHYDROXYALKANOATE BLOCK COPOLYMER AND METHOD FOR PREPARING THE SAME

(71) Applicant: National Kaohsiung University of Science and Technology, Kaohsiung (TW)

(72) Inventors: Der-Shyan Sheu, Kaohsiung (TW); Shun-Ze Siao, Kaohsiung (TW); Chun-Hao Chen, Kaohsiung (TW)

(73) Assignee: NATIONAL KAOHSIUNG UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 554 days.

(21) Appl. No.: 18/081,426

(22) Filed: Dec. 14, 2022

(65) Prior Publication Data
US 2024/0182620 A1    Jun. 6, 2024

(30) Foreign Application Priority Data
Nov. 18, 2022   (TW) ................................. 111144221

(51) Int. Cl.
C08F 293/00   (2006.01)
C08G 63/06   (2006.01)
C08L 67/04   (2006.01)

(52) U.S. Cl.
CPC ............ *C08F 293/00* (2013.01); *C08G 63/06* (2013.01); *C08L 67/04* (2013.01)

(58) Field of Classification Search
CPC ................................. C08L 67/04; C08G 63/08
See application file for complete search history.

(56) References Cited

U.S. PATENT DOCUMENTS 5,502,116 A * 3/1996 Noda ..................... B29B 7/92
525/415
2002/0143136 A1* 10/2002 Noda ..................... B32B 27/36
528/272
2003/0108701 A1* 6/2003 Bond ..................... B32B 27/36
428/35.7

FOREIGN PATENT DOCUMENTS

EP        466050 A *  1/1992  ............. C08G 63/06
WO   WO-02055581 A2 *  7/2002  ............. C08L 67/04
WO   WO-2022090498 A1 *  5/2022  ............. C12N 1/066

* cited by examiner

*Primary Examiner* — Michael L Leonard
(74) *Attorney, Agent, or Firm* — MUNCY, GEISSLER, OLDS & LOWE, P.C.

(57) ABSTRACT

A polyhydroxyalkanoate block copolymer includes a first segment containing a first monomeric unit represented by formula (I); and a second segment containing the first monomeric unit represented by formula (I), a second monomeric unit represented by formula (II), and a third monomeric unit represented by formula (III), (I)

(II)

(III)

(Continued)

The first segment and the second segment are arranged in blocks. A method for preparing the polyhydroxyalkanoate block copolymer is also disclosed.

7 Claims, 10 Drawing Sheets

POLYHYDROXYALKANOATE BLOCK COPOLYMER AND METHOD FOR PREPARING THE SAME

CROSS-REFERENCE TO RELATED APPLICATION

This application claims priority to Taiwanese Invention Patent Application No. 111144221, filed on Nov. 18, 2022.

FIELD

The present disclosure relates to a polyhydroxyalkanoate, and more particularly to a polyhydroxyalkanoate block copolymer. The present disclosure also relates to a method for preparing the polyhydroxyalkanoate block copolymer.

BACKGROUND

Polyhydroxyalkanoate is a type of linear polyester synthesized by bacteria as a source of energy stored in the cells in a growth environment with nutrient deficiency conditions, e.g., excess supply of carbon sources, lack of nitrogen, phosphorus, oxygen, etc. Polyhydroxyalkanoate has physical and chemical properties similar to those of petrochemical-based plastics, and also possesses biocompatibility characteristic which is not found in petrochemical-based plastics. However, in comparison to petrochemical-based plastics which are difficult to be degraded, polyhydroxyalkanoate can be completely degraded into carbon dioxide and water by microorganisms in a natural environment, and thus, is expected to replace petrochemical-based plastics.

The physical properties of polyhydroxyalkanoate are mainly affected by the type, content and arrangement of monomer units thereof. On the other hand, the chemical structure of polyhydroxyalkanoate is very diverse, and might be affected by the type of bacteria, the type of medium, and/or the type of carbon source involved in synthesizing the polyhydroxyalkanoate. At present, there are more than 100 types of different monomer units that make up polyhydroxyalkanoates. Examples of commonly known polyhydroxyalkanoate include, among others, poly-3-hydroxybutyrate (PHB), poly-3-hydroxyvalerate (PHV), and poly(3-hydroxybutyrate-co-3-hydroxyvalerate) (PHBV) which is a random copolymer formed from 3-hydroxybutanoic acid and 3-hydroxyvaleric acid.

The applicants, in an article entitled "Cultivation temperature modulated the monomer composition and polymer properties of polyhydroxyalkanoate synthesized by *Cupriavidus* sp. L7L from levulinate as sole carbon source" published in int. *J. Biol. Macromol.*, 2018, Vol. 118(Pt. B), p. 1558-1564, discloses a polyhydroxyalkanoate copolymer which includes monomeric units that are randomly arranged and which has a good mechanical property. In order to further improve the properties of the polyhydroxyalkanoate copolymer, the applicants has endeavor to develop another polyhydroxyalkanoate copolymer having a molecular structure different from that of the aforesaid polyhydroxyalkanoate copolymer.

SUMMARY

Therefore, in a first aspect, the present disclosure provides a polyhydroxyalkanoate block copolymer which can alleviate at least one of the drawbacks of the prior art.

The polyhydroxyalkanoate block copolymer includes a first segment containing a first monomeric unit represented by formula (I), and a second segment containing the first monomeric unit represented by formula (I), a second monomeric unit represented by formula (II), and a third monomeric unit represented by formula (III),

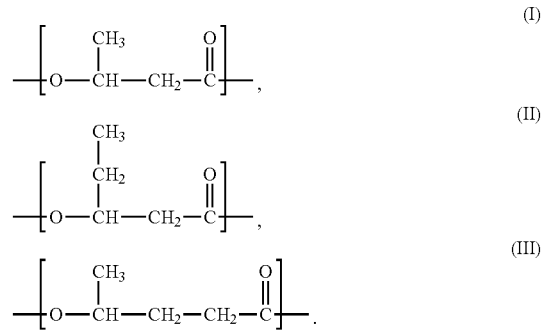

The first segment and the second segment are arranged in blocks.

In a second aspect, the present disclosure provides a method for preparing a polyhydroxyalkanoate block copolymer, which can alleviate at least one of the drawbacks of the prior art.

The method includes the steps of:
(a) cultivating *Cupriavidus necator* H16 in a liquid medium containing gluconic acid, followed by conducting a first fermentation process to obtain a fermented culture, and
(b) adding levulinic acid to the fermented culture, followed by conducting a second fermentation process, so that the levulinic acid is consumed by *Cupriavidus necator* H16, followed by generation of a polyhydroxyalkanoate block copolymer including the first segment and a second segment in *Cupriavidus necator* H16.

In step (a) of the method, the gluconic acid is completely consumed by *Cupriavidus necator* H16, so that a first segment containing a first monomeric unit represented by formula (I) is generated in *Cupriavidus necator* H16, and the fermented culture is substantially free of the gluconic acid. The first segment and the second segment are arranged in blocks. The second segment contains the first monomeric unit represented by formula (I), a second monomeric unit represented by formula (II), and a third monomeric unit represented by formula (III),

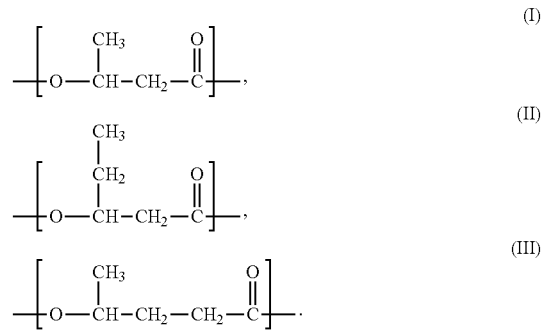

BRIEF DESCRIPTION OF THE DRAWINGS

Other features and advantages of the present disclosure will become apparent in the following detailed description of the embodiment(s) with reference to the accompanying drawings. It is noted that various features may not be drawn to scale.

DETAILED DESCRIPTION

Figure 1:
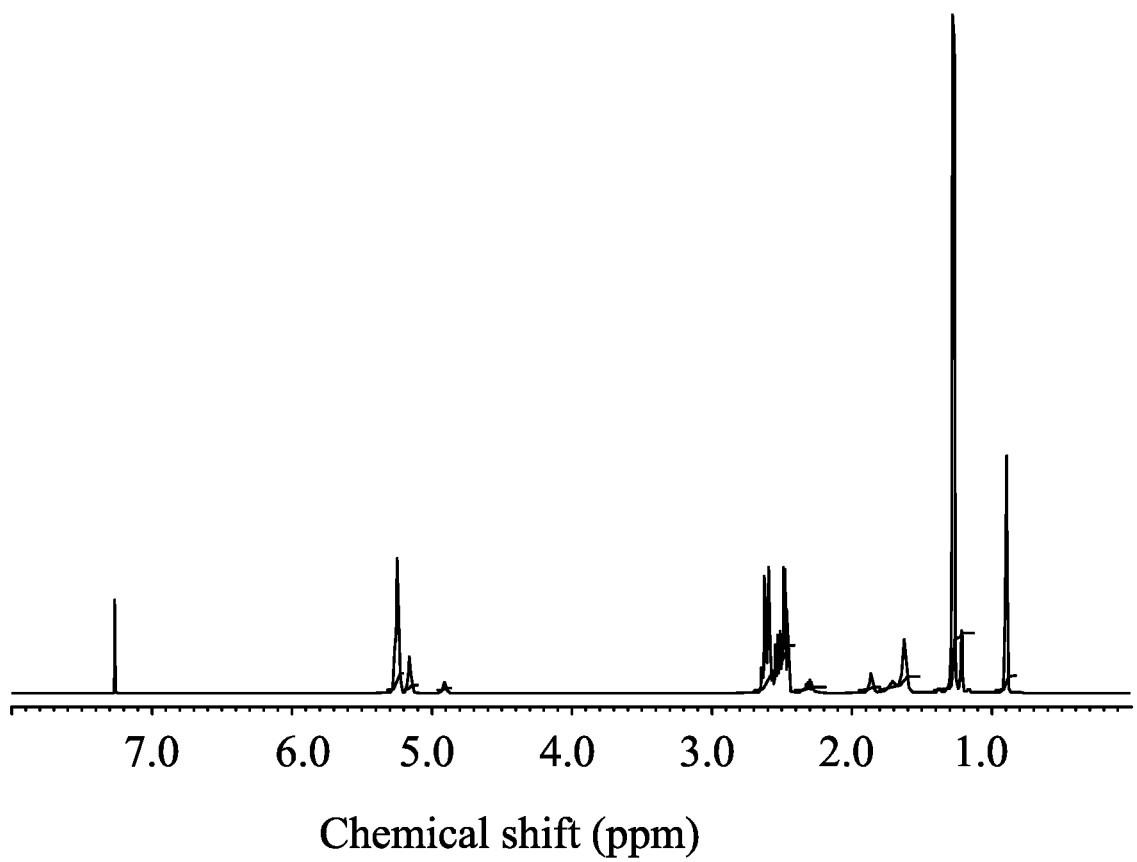
FIG. 1 shows a $^1$H-nuclear magnetic resonance (NMR) spectrum of a polyhydroxyalkanoate block copolymer of Example 1 (EX1) according to the present disclosure.
Figure 2:
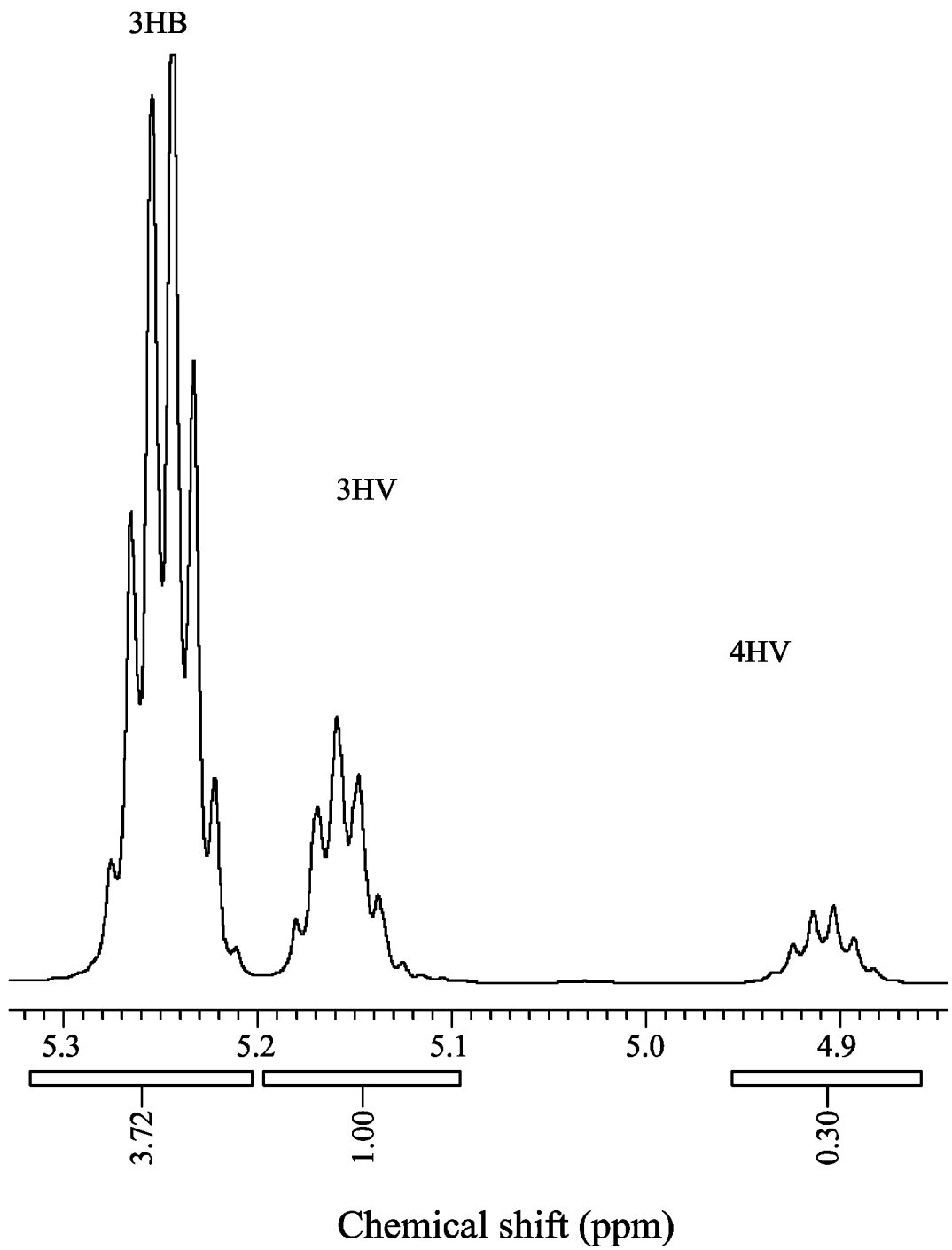
FIG. 2 is a partially enlarged view of the $^1$H-NMR spectrum shown in FIG. 1.
Figure 3:
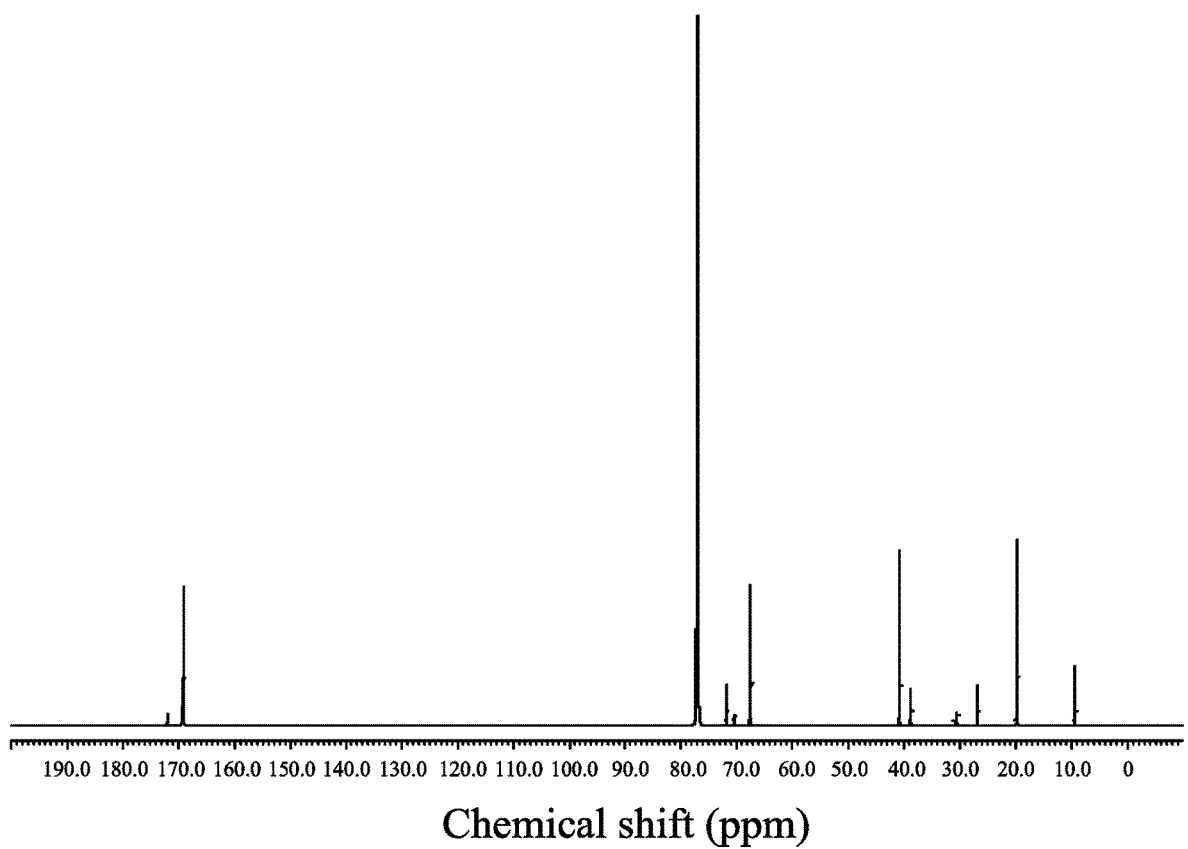
FIG. 3 shows a $^{13}$C-NMR spectrum of the polyhydroxyalkanoate block copolymer of EX1 according to the present disclosure.

Before the present disclosure is described in greater detail, it should be noted that if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides a polyhydroxyalkanoate block copolymer which includes a first segment containing a first monomeric unit represented by formula (I), and a second segment containing the first monomeric unit represented by formula (I), a second monomeric unit represented by formula (II), and a third monomeric unit represented by formula (III),

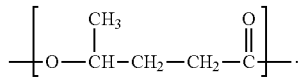
(I)

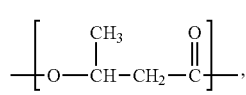
(II)

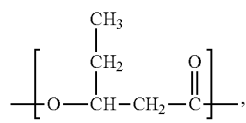

-continued

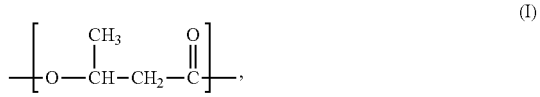
(III)

The first segment and the second segment are arranged in blocks.

In certain embodiments, the first monomeric unit, the second monomeric unit, and the third monomeric unit are randomly arranged in the second segment.

According to the present disclosure, based on the total amount of the first segment and the second segment as 100 mol %, the second monomeric unit is present in an amount ranging from 15 mol % to 50 mol %, the third monomeric unit is present in an amount ranging from 0.3 mol % to 6.0 mol %, and a balance is an amount of the first monomeric unit, such that the polyhydroxyalkanoate block copolymer has an improved mechanical property.

The present disclosure also provides a method for preparing the polyhydroxyalkanoate block copolymer which includes the following steps (a) and (b).

In step (a), *Cupriavidus necator* H16 is cultivated in a liquid medium containing gluconic acid as a first carbon source, followed by conducting a first fermentation process to obtain a fermented culture. The gluconic acid is completely consumed by *Cupriavidus necator* H16, so that a first segment containing a first monomeric unit represented by the formula (I),

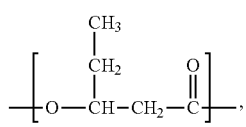
(I)

is generated in *Cupriavidus necator* H16, and the fermented culture is substantially free of the gluconic acid.

In step (b), levulinic acid is added as a second carbon source into the fermented culture, followed by conducting a second fermentation process, so that the levulinic acid is consumed by *Cupriavidus necator* H16, followed by generation of a polyhydroxyalkanoate block copolymer including the first segment and the second segment in *Cupriavidus necator* H16. The second segment contains the first monomeric unit represented by the aforesaid formula (I), the second monomeric unit represented by formula (II), and a third monomeric unit represented by formula (III), (II)

(III)

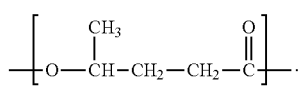

The first segment and the second segment are arranged in blocks

According to the present disclosure, *Cupriavidus necator* H16 (also known as *Raistonia eutropha* H16) is a known bacterial strain that is readily available to the public, and may be purchased from the American Type Culture Collection under an accession number ATCC 17699, German Collection of Microorganisms and Cell Cultures GmbH under an accession number DSM 428, or the Bioresource Collection and Research Center (BCRC) of the Food Industry Research and Development Institute (FIRDI), Taiwan, under an accession number BCRC 13036.

In certain embodiments, in step (a), instead of the liquid medium containing gluconic acid, *Cupriavidus necator* H16 may be cultivated in the liquid medium containing levulinic acid as the first carbon source, followed by conducting the first fermentation process to obtain the fermented culture. That is, in step (a), the levulinic acid is completely consumed by *Cupriavidus necator* H16, so that the second segment containing the first monomeric unit represented by the aforesaid formula (I), the second monomeric unit represented by the aforesaid formula (II), and the third monomeric unit represented by the aforesaid formula (III), is generated in *Cupriavidus necator* H16, and the fermented culture is substantially free of the levulinic acid. Afterwards, in step (b), gluconic acid is added as the second carbon source into the fermented culture, followed by conducting the second fermentation process, so that the gluconic acid is consumed by *Cupriavidus necator* H16, followed by generation of the polyhydroxyalkanoate block copolymer including the second segment and the first segment containing the first monomeric unit represented by the aforesaid formula (I) in *Cupriavidus necator* H16, and the fermented culture is substantially free of the gluconic acid. The first segment and the second segment are arranged in blocks.

According to the present disclosure, in order to allow the first segment and the second segment of the polyhydroxyalkanoate block copolymer to be arranged in blocks, in step (a), when gluconic acid is used as the first carbon source for cultivating *Cupriavidus necator* H16 so as to obtain the fermented culture, step (b) of adding the levulinic acid as the second carbon source into the fermented culture is conducted only after the fermented culture is substantially free of the gluconic acid. In other words, in step (a), if the gluconic acid is not completely consumed by *Cupriavidus necator* H16, step (b), i.e., adding the levulinic acid into the fermented culture, will not be conducted. Likewise, in certain embodiments, in step (a), when levulinic acid is used as the first carbon source for cultivating *Cupriavidus necator* H16 so as to obtain the fermented culture, step (b) of adding the gluconic acid as the second carbon source into the fermented culture is conducted only after the fermented culture is substantially free of the levulinic acid. In other words, in step (a), if the levulinic acid is not completely consumed by *Cupriavidus necator* H16, step (b), i.e., adding the gluconic acid into the fermented culture, will not be conducted.

According to the present disclosure, in an exemplary embodiment, in step (a), gluconic acid is used as the first carbon source, and in step (b), the levulinic acid is used as the second carbon source, so that the growth rate of *Cupriavidus necator* H16 can be increased, thereby improving the yield of the polyhydroxyalkanoate block copolymer.

According to the present disclosure, the polyhydroxyalkanoate block copolymer may be obtained when steps (a) and (b) of the method are conducted once. It should be noted that, in order to increase the numbers of the first segment and the second segment of the polyhydroxyalkanoate block copolymer, each of steps (a) and (b) is repeatedly conducted a plurality of times. In addition, the longer the time period for conducting steps (a) and (b), the longer the lengths of the first segment and the second segment of the polyhydroxyalkanoate block copolymer are. In certain embodiments, each of steps (a) and (b) is repeatedly conducted a plurality of times.

According to the present disclosure, the amount of the first monomeric unit may be regulated by controlling the concentration of the gluconic acid, and the amount of the second monomeric unit may be regulated by controlling the concentration of the levulinic acid. In certain embodiments, in order to confer improved mechanical properties to the polyhydroxyalkanoate block copolymer, in step (a), the liquid medium contains 0.2% w/v to 0.4% w/v of the gluconic acid. In certain embodiments, in order to confer improved mechanical properties to the polyhydroxyalkanoate block copolymer, in step (b), the fermented culture contains 0.05% w/v to 0.2% w/v of the levulinic acid.

In certain embodiments, the liquid medium is a mineral salt liquid medium. The composition of the mineral salt liquid medium is not particularly limited, as long as the mineral salt liquid medium is suitable for the growth of *Cupriavidus necator* H16, and can be flexibly adjusted by those skilled in the art according to growth requirements of *Cupriavidus necator* H16. In certain embodiments, the mineral salt liquid medium which includes water, $Na_2HPO_4 \cdot 2H_2O$, $KH_2PO_4$, $(NH_4)_2SO_4$ and $MgSO_4 \cdot 7H_2O$.

The present disclosure will be described by way of the following examples. However, it should be understood that the following examples are intended solely for the purpose of illustration and should not be construed as limiting the present disclosure in practice.

EXAMPLES

Preparation of Polyhydroxyalkanoate Block Copolymer

Example 1 (EX1)

First, *Cupriavidus necator* H16 (purchased from Bioresource Collection and Research Center (BCRC) of the Food Industry Research and Development Institute (FIRDI), Taiwan, under an accession number BCRC 13036) was inoculated into 25 mL of an LB broth (Manufacturer: BD Difco™), and was then cultured at a temperature of 30° C. for a time period ranging from 16 hours to 18 hours to activate the bacterial strain, thereby obtaining a bacterial culture. At the same time, a mineral salt liquid medium was prepared, and includes water, $Na_2HPO_4 \cdot 2H_2O$ having a concentration of 4.45 g/L, $KH_2PO_4$ having a concentration of 1.5 g/L, $(NH_4)_2SO_4$ having a concentration of 1.0 g/L, $MgSO_4 \cdot 7H_2O$ having a concentration of 0.1 g/L, $CaCl_2 \cdot 2H_2O$ having a concentration of 0.01 g/L, $FeSO_4 \cdot 7H_2O$ having a concentration of 12 mg/L, and a trace element solution having a concentration of 1 mL/L. The trace element solution includes $H_3BO_3$ having a concentration of 0.3 g/L, $CoCl_2 \cdot 6H_2O$ having a concentration of 0.2 g/L, $ZnSO_4 \cdot 7H_2O$ having a concentration of 0.1 g/L, $MnCl_2 \cdot 4H_2O$ having a concentration of 0.03 g/L, $Na_2MoO_4 \cdot 2H_2O$ having a concentration of 0.03 g/L, $NiCl_2 \cdot 6H_2O$ having a concentration of 0.02 g/L, and $CuSO_4 \cdot 5H_2O$ having a concentration of 0.01 g/L.

Next, 60 mL of the bacterial culture was cultivated in 2 L of the mineral salt liquid medium containing 0.2% w/v of gluconic acid, so as to conduct first fermentation process at a temperature of 25° C. and under a speed of 180 rpm for a predetermined time period, thereby obtaining a first fermented culture. During the first fermentation process, the bacterial culture was subjected to light absorbance measurements at a wavelength of 600 nm ($OD_{600}$) using a spectrophotometer (Manufacturer: Hitachi, Ltd.; Model no.: U-2800) so as to determine growth condition of *Cupriavidus necator* H16, until the bacterial count no longer increased, indicating that the gluconic acid had been completely consumed by *Cupriavidus necator* H16. Thereafter, levulinic acid was added to the fermented culture such that the fermented culture contained 0.1% w/v of levulinic acid, followed by conducting a second fermentation process at a temperature of 25° C. and under a speed of 180 rpm for a predetermined time period, thereby obtaining a second fermented culture. During the second fermentation process, the fermented culture was subjected to light absorbance measurements at a wavelength of 600 nm ($OD_{600}$) using the aforesaid spectrophotometer so as to determine growth condition of *Cupriavidus necator* H16, until the bacterial count no longer increased, indicating that the levulinic acid had been completely consumed by *Cupriavidus necator* H16. Then, the first fermentation process utilizing gluconic acid as the single carbon source and the second fermentation process utilizing levulinic acid as the single carbon source were sequentially and repeatedly conducted (i.e., the gluconic acid and the levulinic acid did not coexist in the first and second fermented cultures) for a total time period of 72 hours, thereby obtaining a final fermented culture.

Thereafter, the final fermented culture was subjected to centrifugation under a speed of 5000×g for 10 minutes so as to form supernatant and pellet fractions. After the supernatant was removed, the pellet was subjected to a freeze-drying treatment, so as to obtain a dried bacterial powder. Then, 1 g of the dried bacterial powder was added into 30 mL of dichloromethane, followed by heating at 45° C. for 24 hours so as to obtain a crude extract. Afterwards, the crude extract was left to stand so as to allow cell debris to settle, followed by subjecting the crude extract to a filtration process using a filter paper (Manufacturer: Advantec Co., Ltd.), so as to collect the filtrate. Subsequently, the filtrate was slowly dropped onto ice-cold methanol having a volume 10 times of that of the filtrate under continuous stirring, so as to precipitate polyhydroxyalkanoate block copolymer therefrom, thereby obtaining a polyhydroxyalkanoate block copolymer of EX1. The polyhydroxyalkanoate block copolymer of EX1 was washed once with 100% methanol, and then placed in a vacuum suction apparatus for removal of residual organic solvent, until a constant weight was achieved.

Example 2 (EX2)

The procedures and conditions for preparing the polyhydroxyalkanoate block copolymer of EX2 were substantially similar to those of EX1, except that in EX2, the fermented culture contained 0.075% w/v of levulinic acid.

Property Evaluation

1. Nuclear Magnetic Resonance (NMR) Analysis

A respective one of the polyhydroxyalkanoate block copolymers of EX1 and EX2 was dissolved in deuterated chloroform, and then subjected to NMR spectroscopy using an NMR spectrometer (Manufacturer: JEOL, Ltd.; Model no.: ECZ-600R). The results are shown in FIGS. 1 to 8. To be specific, for the polyhydroxyalkanoate block copolymer of EX1, the $^1$H-NMR spectra thereof are respectively shown in FIGS. 1 and 2, while the $^{13}$C-NMR spectra thereof are respectively shown in FIGS. 3 and 4. For the polyhydroxyalkanoate block copolymer of EX2, the $^1$H-NMR spectra thereof are respectively shown in FIGS. 5 and 6, while the $^{13}$C-NMR spectra thereof are respectively shown in FIGS. 7 and 8.

The identities of the peaks at specific chemical shift ranges in the $^1$H-NMR spectra of the polyhydroxyalkanoate block copolymers of EX1 and EX2 were determined based on to an article by Henry E. Valentin et al. entitled "Identification of 4-hydroxyvaleric acid as a constituent of biosynthetic polyhydroxyalkanoic acids from bacteria" which was published in *Appl. Microbiol. Biotechnol.*, 1992, Vol. 36, p. 507-514. Referring to FIGS. 1, 2, 5 and 6, in the $^1$H-NMR spectra of the polyhydroxyalkanoate block copolymers of EX1 and EX2, the chemical shift signal at between 5.2 ppm to 5.3 ppm was indicative of the presence of the first monomeric unit represented by formula (I) (abbreviated as 3HB), the chemical shift signal at between 5.1 ppm to 5.2 ppm was indicative of the presence of the second monomeric unit represented by formula (II) (abbreviated as 3HV), and the chemical shift signal at between 4.86 ppm to 4.94 ppm was indicative of the presence of the third monomeric unit represented by formula (III) (abbreviated as 4HV). Referring again to the $^1$H-NMR spectra of the polyhydroxyalkanoate block copolymers of EX1 shown in FIG. 2, a ratio of the integrated peak area at chemical shift region of the first monomeric unit to the integrated peak area at chemical shift region of the second monomeric unit to the integrated peak area at chemical shift region of the third monomeric unit is determined, so as to calculate the amounts (in mol %) of the first monomeric unit, the second monomeric unit, and the third monomeric unit of the polyhydroxyalkanoate block copolymers of EX1. Likewise, the amounts (in mol %) of the first monomeric unit, the second monomeric unit and the third monomeric unit of the polyhydroxyalkanoate block copolymers of EX2 can be calculated after determining the ratio of the integrated peak area at chemical shift region of the first monomeric unit to the integrated peak area at chemical shift region of the second monomeric unit to the integrated peak area at chemical shift region of the third monomeric unit. The results are shown in Table 1 below.

Figure 4:
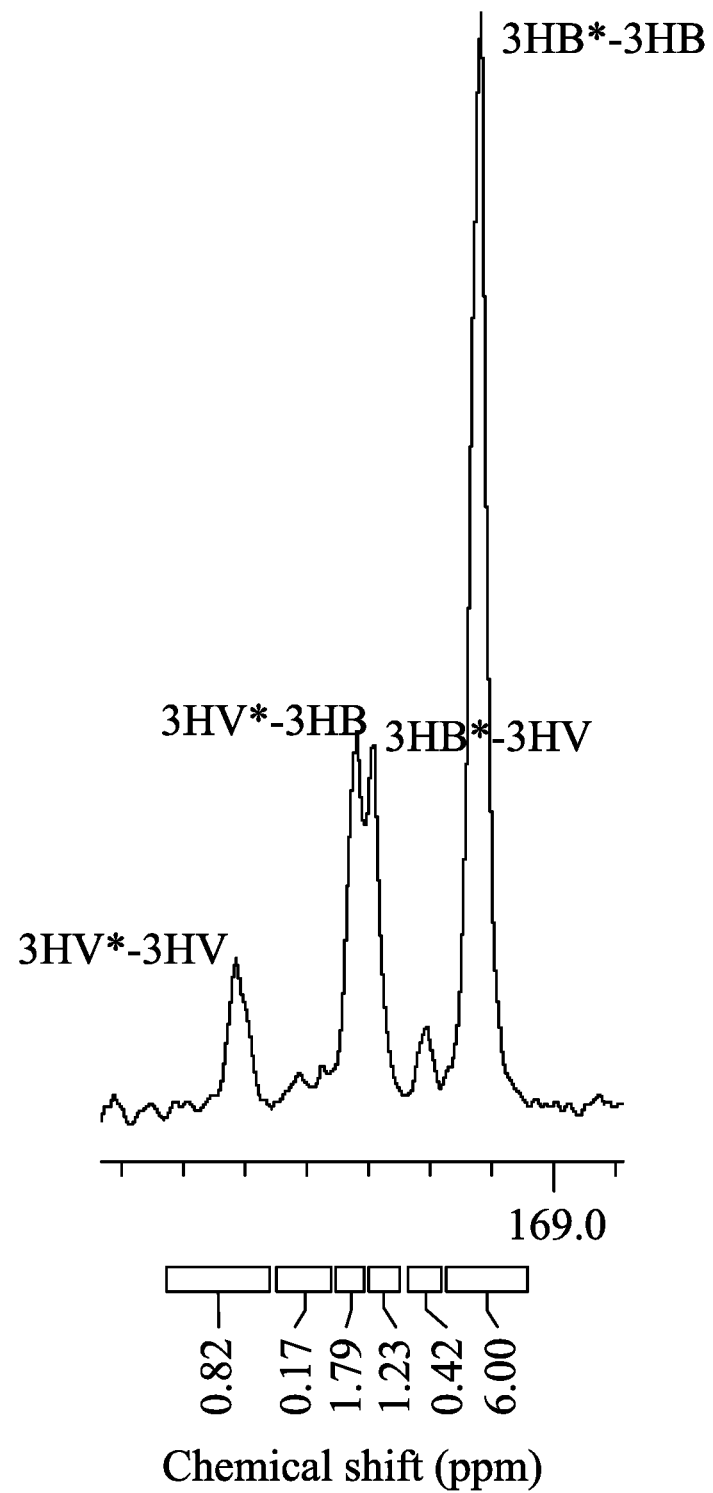
FIG. 4 is a partially enlarged view of the $^{13}$C-NMR spectrum shown in FIG. 3.
Figure 5:
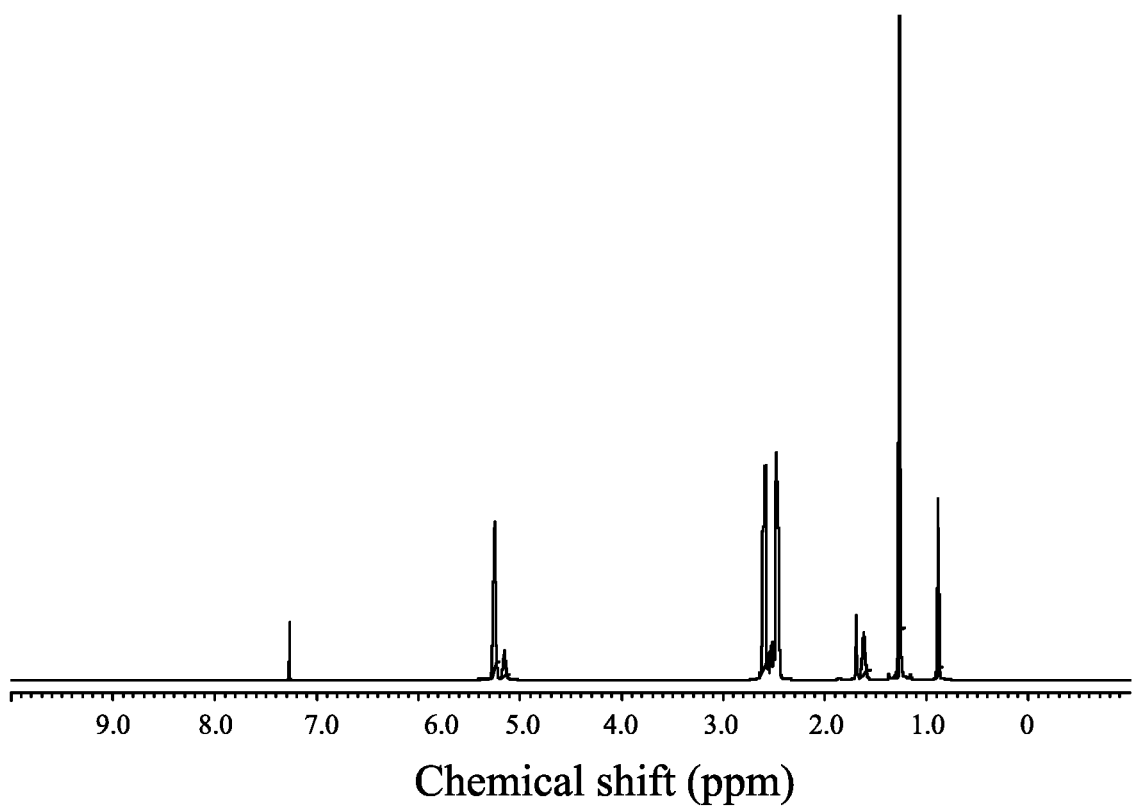
FIG. 5 shows a $^1$H-NMR spectrum of the polyhydroxyalkanoate block copolymer of EX2 according to the present disclosure.
Figure 6:
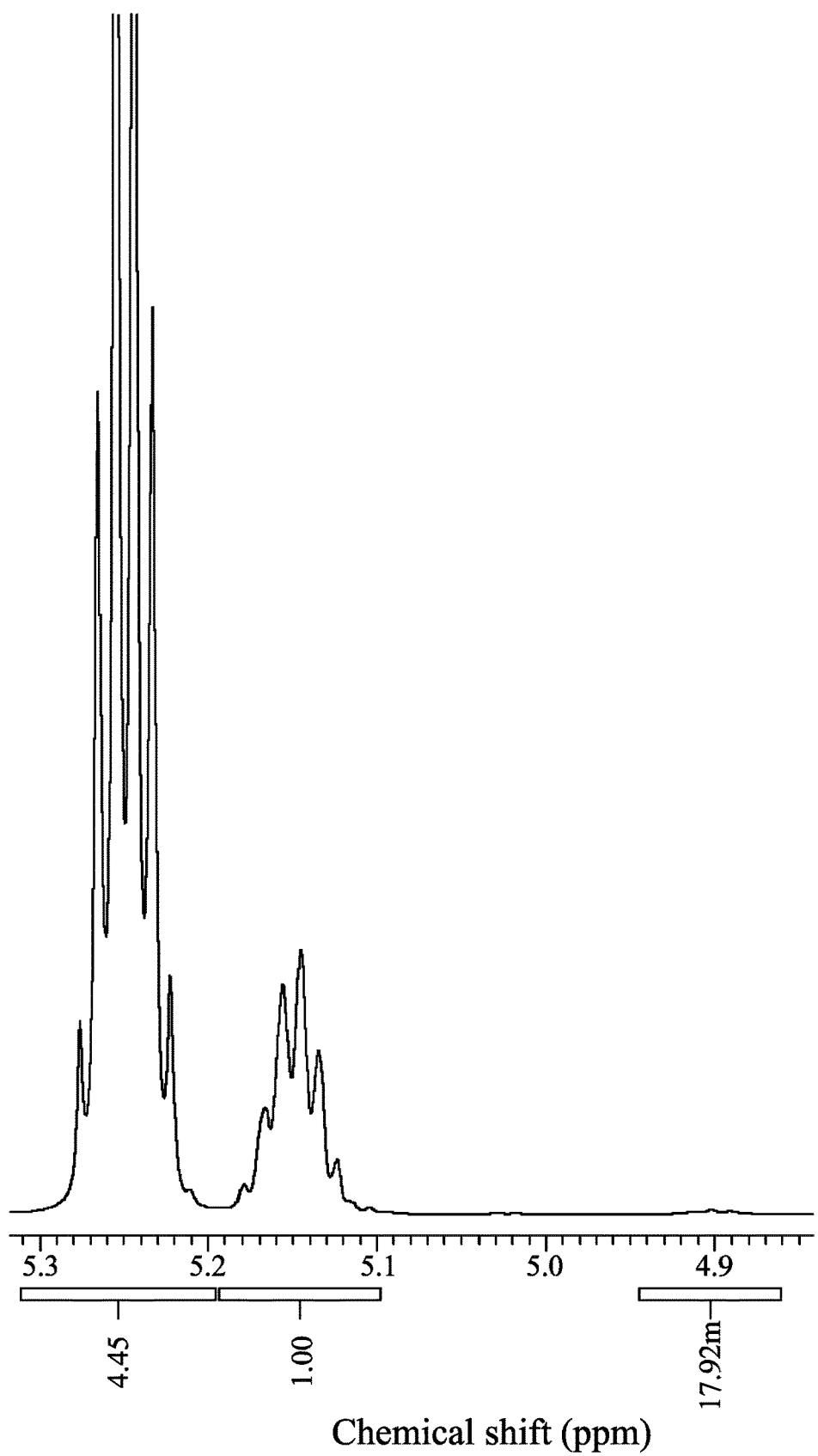
FIG. 6 is partially enlarged view of the $^1$H-NMR spectrum shown in FIG. 5.
Figure 7:
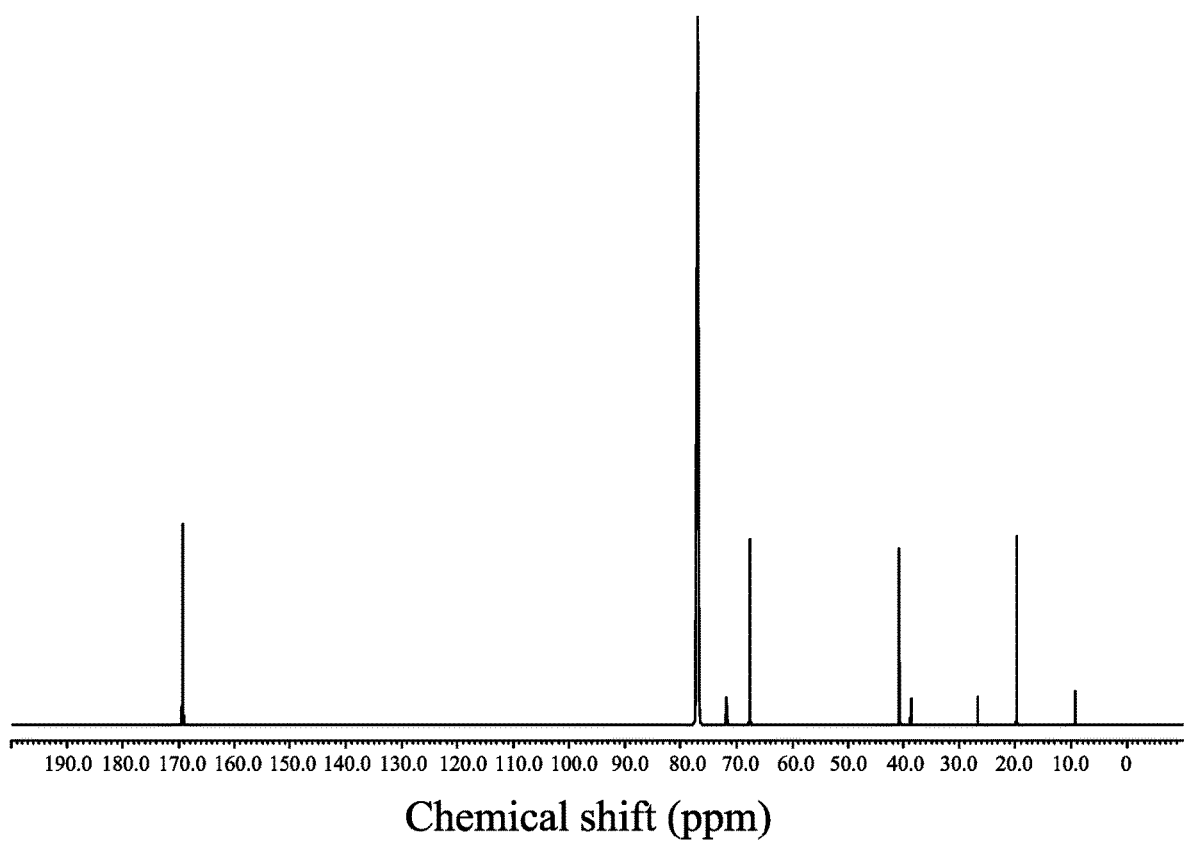
FIG. 7 shows a $^{13}$C-NMR spectrum of the polyhydroxyalkanoate block copolymer of EX2 according to the present disclosure.
Figure 8:
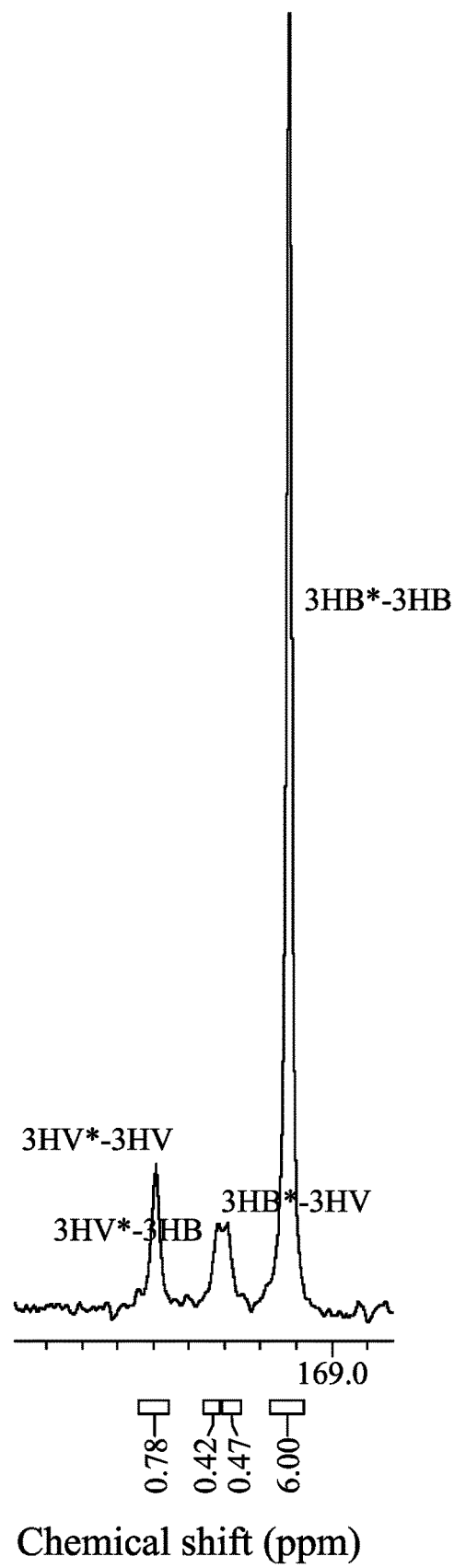
FIG. 8 is a partially enlarged view of the $^{13}$C-NMR spectrum shown in FIG. 7.

Referring to the $^{13}$C-NMR spectra of the polyhydroxyalkanoate block copolymers of EX1 and EX2 respectively shown in FIGS. 4 and 8, after determining the integrated peak areas at chemical shift regions of 169 ppm to 170 ppm, the D values of the polyhydroxyalkanoate block copolymers of EX1 and EX2 were respectively calculated using the following Equation (I):

$$D \text{ value} = (A1 \times A2) \div (B1 \times B2) \qquad (I)$$

in which

A1=integrated peak area at chemical shift region of 3HB*-3HB (a 3HB peak adjacent to the other 3HB peak)

A2=integrated peak area at chemical shift region of 3HV*-3HV (a 3HV peak adjacent to the other 3HV peak)

A3=integrated peak area at chemical shift region of 3HV*-3HB (a 3HV peak adjacent to a 3HB peak)

A4=integrated peak area at chemical shift region of 3HB*-3HV (a 3HB peak adjacent to a 3HV peak)

The results are shown in Table 1 below.

TABLE 1

| Polyhydroxyalkanoate block copolymer | | EX1 | EX2 |
|---|---|---|---|
| Amount (mol %) | First monomeric unit (3HB) | 74 | 81.4 |

TABLE 1-continued

| Polyhydroxyalkanoate block copolymer | EX1 | EX2 |
|---|---|---|
| $$-\left[-O-\underset{\underset{CH_3}{|}}{CH}-CH_2-\underset{\underset{O}{\|}}{C}-\right]-$$ Formula (I) Second monomeric unit (3HV) | 20 | 18.3 |
| $$-\left[-O-\underset{\underset{\underset{CH_3}{|}}{\underset{CH_2}{|}}}{CH}-CH_2-\underset{\underset{O}{\|}}{C}-\right]-$$ Formula (II) Third monomeric unit (4HV) | 6.0 | 0.3 |
| $$-\left[-O-\underset{\underset{CH_3}{|}}{CH}-CH_2-CH_2-\underset{\underset{O}{\|}}{C}-\right]-$$ Formula (III) D value | 2.2 | 23.7 |

2. Differential Scanning Calorimetry (DSC) Analysis

Figure 9:
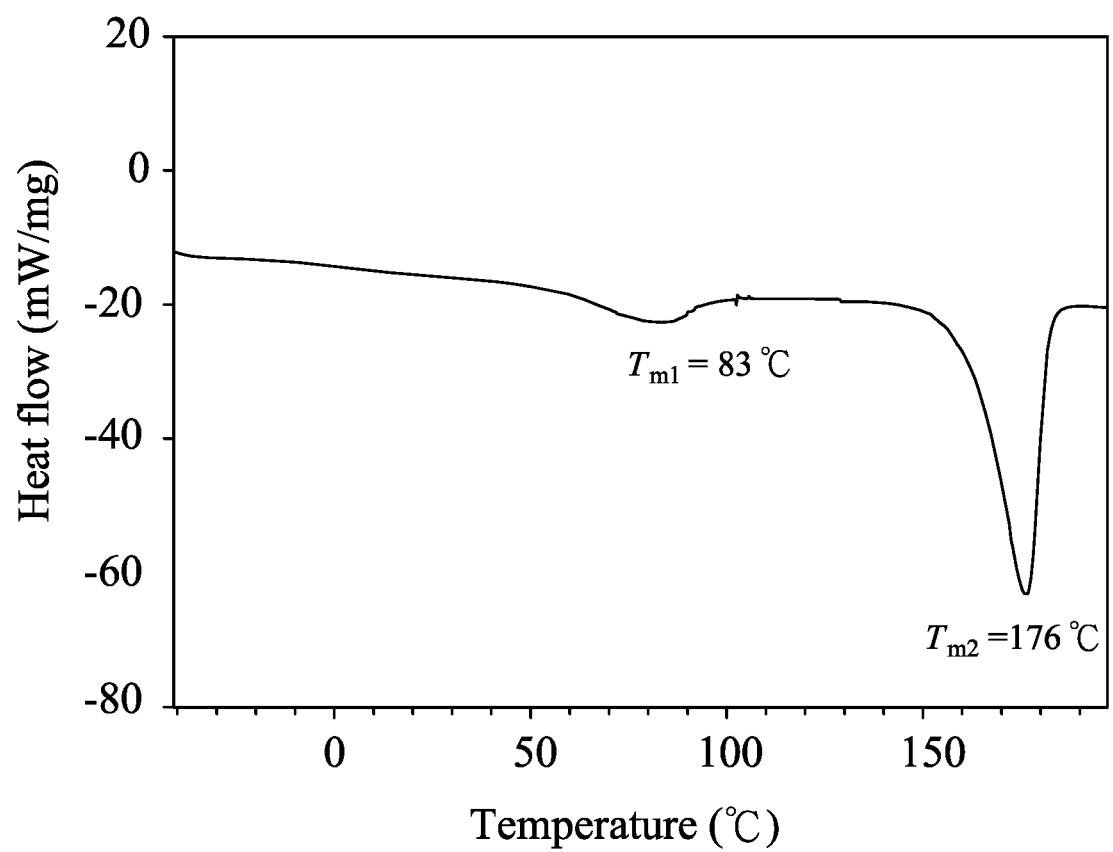
FIG. 9 shows a differential scanning calorimetry (DSC) curve obtained by subjecting the polyhydroxyalkanoate block copolymer of EX2 to a first heating treatment.
Figure 10:
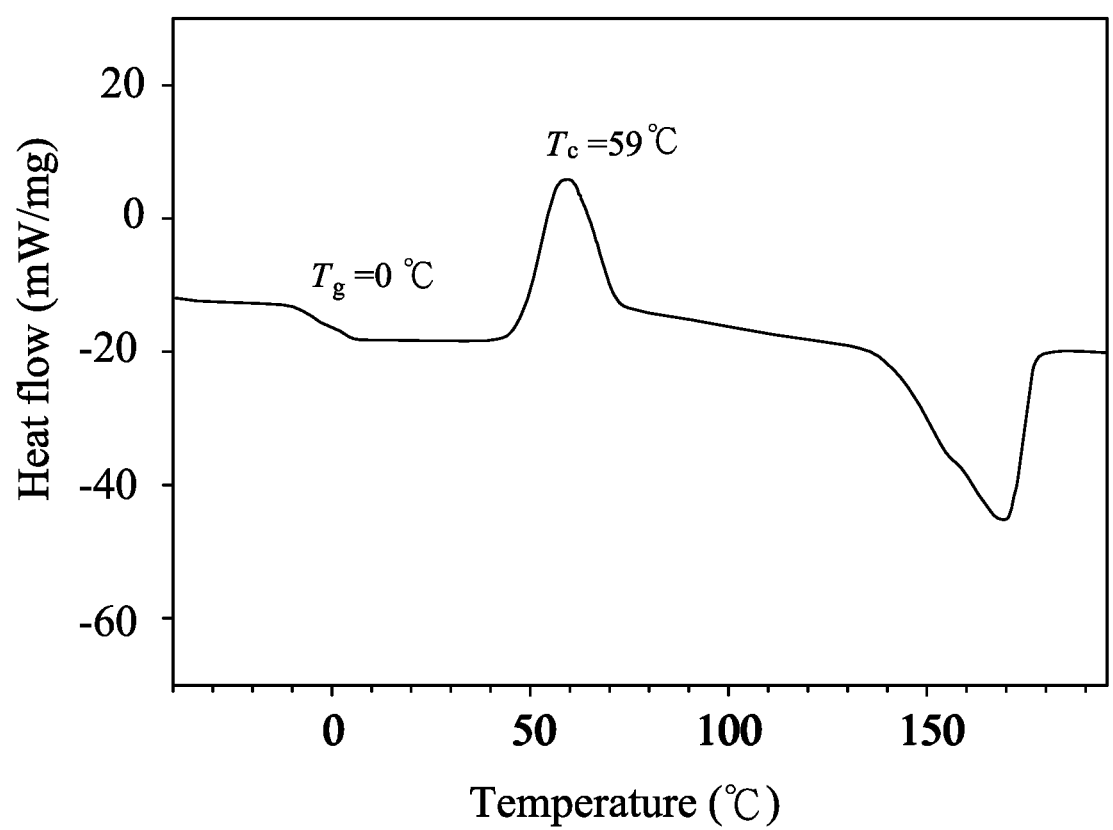
FIG. 10 shows a DSC curve obtained by subjecting the polyhydroxyalkanoate block copolymer of EX2 to a second heating treatment.

The polyhydroxyalkanoate block copolymer of EX2 was further subjected to DSC analysis with using a differential scanning calorimeter (DSC) (Manufacturer: TA Instruments, Inc.: Model: DSC Q100). The DSC analysis includes a first heating treatment, in which the test temperature was raised from −50° C. to 200° C. at a heating rate of 10° C./minute and then kept at 200° C. for 3 minutes, and a second heating treatment, in which the test temperature was raised from −50° C. to 200° C. at a heating rate of 10° C./minute. The DSC curve of the first heating treatment is shown in FIG. 9, and the DSC curve of the second heating treatment is shown in FIG. 10. The first and second melting temperatures determined from the first heating treatment, and the crystallization temperature and the glass transition temperature determined from the second heating treatment are shown in Table 2.

TABLE 2

| | First heating treatment | | Second heating treatment | |
|---|---|---|---|---|
| | First melting temperature $T_{m1}$ (° C.) | Second melting temperature $T_{m2}$ (° C.) | Crystallization temperature $T_c$ (° C.) | Glass transition temperature $T_g$ (° C.) |
| EX2 | 83 | 176 | 59 | 0 |

Naoko Kamiya et al., in an article entitled "Microstructure of bacterially synthesized poly(3-hydroxybutyrate-3-hydroxyvalerate)" published in *Macromolecules*, 1989, Vol. 22(4), p, 1676-1682, and Anna Ferre-Guell et al., in an article entitled "Biosynthesis and characterization of polyhydroxyalkanoates with controlled composition and microstructure" published in *Macromolecules*, 1999, Vol. 63(1), p. 21-53, disclose that if a polyhydroxyalkanoate copolymer has a D value greater than 1.5, such polyhydroxyalkanoate copolymer has a block structure. Referring to Table 1, the polyhydroxyalkanoate block copolymers of EX1 and EX2 each has a block structure because the D value thereof is greater than 1.5.

Lara L. Madison et al., in an article entitled "Metabolic engineering of poly(3-hydroxyalkanoates): from DNA to plastic" published in *Microbiol. Mol. Biol. Rev.*, 1999, Vol. 63(1), p. 21-53, discloses that the melting temperature of a random copolymer consisting of 20 mol % of 3HV and 80 mol % of 3HB is 145° C., and the melting temperature of a homopolymer consisting of 100 mol % of 3HB is 177° C. Referring to Tables 1 and 2 and FIG. 9, the contents of 3HV and 3HB in the polyhydroxyalkanoate block copolymer of EX2 are substantially similar to those of the random copolymer disclosed in the aforesaid article, however, the polyhydroxyalkanoate block copolymer of EX2 has a first melting temperature, $T_{m1}$ (i.e., 83° C.), and a second melting temperature, $T_{m2}$ (i.e., 176° C.), that are completely different from the melting temperature of the random copolymer disclosed in the aforesaid article, indicating that the polyhydroxyalkanoate block copolymer of EX2 should be a polyhydroxyalkanoate block copolymer including two different segments, and the monomeric units of these two segments are different from each other. Since the second melting temperature, $T_{m2}$ (i.e., 176° C.), of the polyhydroxyalkanoate block copolymer of EX2 is approximately similar to the melting temperature (i.e., 177° C.) of the homopolymer consisting of 100 mol % of 3HB as disclosed in the aforesaid article, one of the two segments of the polyhydroxyalkanoate block copolymer of EX2 is entirely consists of 3HB, and thus, the first melting temperature, $T_{m1}$ (i.e., 83° C.) of the polyhydroxyalkanoate block copolymer of EX2 should be contributed by the presence of the other one of the two segments which consists of randomly arranged 3HV, 3HB and 4HV. In addition, referring again to FIG. 9, the peak area of the second melting temperature, $T_{m2}$, is significantly greater than the peak area of the first melting temperature, $T_{m1}$, suggesting that, in the polyhydroxyalkanoate block copolymer of EX2, the segment entirely consisting of 3HB serves as the main polymer block whereas the other segment consisting of randomly arranged 3HV, 3HB and 4HV serves as the secondary polymer block.

Oliveira F. C. et al., in an article entitled "Characterization of poly(3-hydroxybutyrate) produced by *Cupriavidus necator* in solid-state fermentation" published in *Bioresource Technology*, 2007, Vol. 98(3), p. 633-638, discloses that a homopolymer consisting of 3HB has a glass transition temperature ranging from −0.3° C. to −1.1° C., and a crystallization temperature ranging from 86.6° C. to 92.3° C. Referring to Table 2 and FIG. 10, the glass transition temperature, $T_g$ (i.e., 0° C.) of the polyhydroxyalkanoate block copolymer of EX2 is within the glass transition temperature range of the homopolymer consisting of 3B disclosed in the aforesaid article, however, the polyhydroxyalkanoate block copolymer of EX2 has a crystallization temperature, $T_c$ (i.e., 59° C.) that is significantly different from that of the homopolymer consisting of 3B disclosed in the aforesaid article, indicating that in the polyhydroxyalkanoate block copolymer of EX2, the segment consisting of 3HB and the other segment consisting of randomly arranged 3HV, 3HB and 4HV exist to form a block copolymer chain, and are not blended to each other.

Shang L. et al., in an article entitled "Thermal properties and biodegradability studies of poly(3-hydroxybutyrate-co-3-hydroxyvalerate)" published in *J. Polym. Environ.*, 2012, Vol. 20, p. 23-28, discloses that the crystallization temperature of a polymer, e.g., a homopolymer consisting of 3HB, can be readily determined from a DSC curve obtained by DSC analysis, however, the crystallinity of a random copolymer consisting of 3HV and 3HB correspondingly decreased with increase of 3HB content therein, resulting in the peak representing the crystallization temperature of the random polymer becoming less obvious, and when 3HB was present in an amount of up to 20.7 mol %, the peak representing the crystallization temperature of such random polymer became significantly less obvious, which results in the crystallization temperature of such random polymer cannot be readily determined from the DSC curve. However, as shown in FIG. 10, the DSC curve of the polyhydroxyalkanoate block copolymer of EX2 has a very significant peak which allows the crystallization temperature, $T_c$ (i.e., 59° C.), to be readily determined, indicating that the polyhydroxyalkanoate block copolymer of EX2 has a block structure, and monomeric units thereof are not randomly arranged.

The aforesaid results and discussions confirm that the polyhydroxyalkanoate block copolymers of EX1 and EX2 includes a first segment which contains 3HB and which serves as a main polymer block, and a second segment which contains the randomly arranged 3HV, 3HB and 4HV and which serves as a secondary polymer block. The first segment and the second segment are arranged in blocks.

The applicants, in an article entitled "Cultivation temperature modulated the monomer composition and polymer properties of polyhydroxyalkanoate synthesized by *Cupriavidus* sp. L7L from levulinate as sole carbon source" published in *Int. J. Biol. Macromol.*, 2018, Vol. 118(Pt. B) p. 1558-1564, discloses that a low content of 4HV allows the resultant polyhydroxyalkanoate copolymer to have good ductility. Referring back to Table 1, since 4HV is present in an amount ranging from 0.3 mol % to 6.0 mol % in each of the polyhydroxyalkanoate block copolymers of EX1 and EX2, the polyhydroxyalkanoate block copolymers of EX1 and EX2 are expected to have good ductility.

In addition, Erik N. Pederson et al., in an article entitled "Bacterial synthesis of PHA block copolymers" published in *Biomacromolecules*, 2006, Vol. 7(6), p. 1904-1911, and Ying Wang et al., in an article entitled "Polyhydroxyalkanoates, challenges and opportunities" published in *Curr. Opin. Biotechnol.*, 2014, Vol. 30, p. 59-65, disclose that with regard to polyhydroxyalkanoates, in comparison to random copolymers, block copolymers have improved anti-aging properties and would not become brittle for a long period of storage. Since the aforesaid results and discussions demonstrated that the polyhydroxyalkanoate block copolymers of EX1 and EX2 indeed have block structures, the polyhydroxyalkanoate block copolymers of EX1 and EX2 are expected to have good anti-aging properties.

In summary, in the method for preparing the polyhydroxyalkanoate block copolymer of the present disclosure, by cultivating *Cupriavidus necator* H16 in the liquid medium containing gluconic acid and then conducting the first fermentation process to obtain the fermented culture that is substantially free of gluconic acid, followed by adding levulinic acid to the fermented culture and then conducting a second fermentation process so that the levulinic acid is consumed by *Cupriavidus necator* H16, the polyhydroxyalkanoate block copolymer including the first segment and the segment that are arranged in blocks are generated, and such polyhydroxyalkanoate block copolymer has good anti-aging properties.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A polyhydroxyalkanoate block copolymer, comprising:
   a first segment containing a first monomeric unit represented by formula (I); and
   a second segment containing the first monomeric unit represented by formula (I), a second monomeric unit represented by formula (II), and a third monomeric unit represented by formula (III),

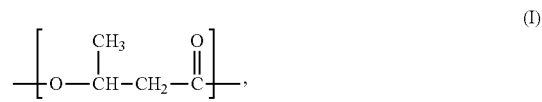

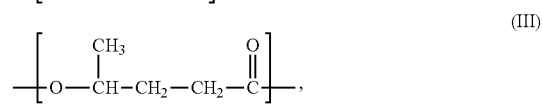

wherein the first segment and the second segment are arranged in blocks.

2. The polyhydroxyalkanoate block copolymer as claimed in claim 1, wherein the first monomeric unit, the second monomeric unit, and the third monomeric unit are randomly arranged in the second segment.

3. The polyhydroxyalkanoate block copolymer as claimed in claim 1, wherein based on the total amount of the first segment and the second segment as 100 mol %, the second monomeric unit is present in an amount ranging from 15 mol % to 50 mol %, the third monomeric unit is present in an amount ranging from 0.3 mol % to 6.0 mol %, and a balance being an amount of the first monomeric unit.

4. A method for preparing a polyhydroxyalkanoate block copolymer, comprising the steps of:

(a) cultivating *Cupriavidus necator* H16 in a liquid medium containing gluconic acid, followed by conducting a first fermentation process to obtain a fermented culture, wherein the gluconic acid is completely consumed by *Cupriavidus necator* H16, so that a first segment containing a first monomeric unit represented by formula (I) is generated in *Cupriavidus necator* H16, and the fermented culture is substantially free of the gluconic acid; and (b) adding levulinic acid to the fermented culture, followed by conducting a second fermentation process, so that the levulinic acid is consumed by *Cupriavidus necator* H16, followed by generation of a polyhydroxyalkanoate block copolymer including the first segment and a second segment in *Cupriavidus necator* H16, wherein the first segment and the second segment are arranged in blocks, and the second segment contains the first monomeric unit represented by formula (I), a second monomeric unit represented by formula (II), and a third monomeric unit represented by formula (III),

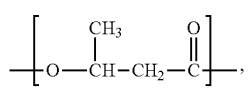 (I)

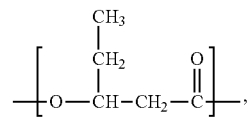 (II)

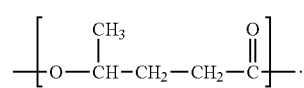 (III)

5. The method as claimed in claim 4, wherein in step (a), the liquid medium contains 0.2% w/v to 0.4% w/v of the gluconic acid.

6. The method as claimed in claim 4, wherein in step (b), the fermented culture contains 0.05% w/v to 0.2% w/v of the levulinic acid.

7. The method as claimed in claim 4, wherein in step (a), the liquid medium is a mineral salt liquid medium which includes water, $Na_2HPO_4 \cdot 2H_2O$, $KH_2PO_4$, $(NH_4)_2SO_4$ and $MgSO_4 \cdot 7H_2O$.

* * * * *